United States Patent
Call et al.

(10) Patent No.: US 9,413,776 B2
(45) Date of Patent: *Aug. 9, 2016

(54) SYSTEM FOR FINDING CODE IN A DATA FLOW

(71) Applicant: Shape Security, Inc., Mountain View, CA (US)

(72) Inventors: Justin David Call, Santa Clara, CA (US); Oscar Hunter Steele, III, Pompano Beach, FL (US)

(73) Assignee: Shape Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,717

(22) Filed: Oct. 5, 2015

(65) Prior Publication Data

US 2016/0072829 A1    Mar. 10, 2016

Related U.S. Application Data

(63) Continuation of application No. 13/527,025, filed on Jun. 19, 2012, now Pat. No. 9,158,893.

(60) Provisional application No. 61/600,145, filed on Feb. 17, 2012.

(51) Int. Cl.
*G06F 11/00* (2006.01)
*H04L 29/06* (2006.01)
(Continued)

(52) U.S. Cl.
CPC ............ *H04L 63/1416* (2013.01); *G06F 21/00* (2013.01); *G06F 21/55* (2013.01);
(Continued)

(58) Field of Classification Search
CPC ......... G06F 21/00; G06F 21/55; G06F 21/56; G06F 21/562; G06F 21/554; H04L 63/1425
USPC ........................................ 26/22–25
See application file for complete search history.

(56) References Cited

U.S. PATENT DOCUMENTS

| | | |
|---|---|---|
| 5,509,076 A | 4/1996 | Sprunk |
| 7,058,699 B1 | 6/2006 | Chiou et al. |

(Continued)

FOREIGN PATENT DOCUMENTS

WO    WO2013091709    6/2013

OTHER PUBLICATIONS

Hofmeyr et al., "Intrusion Detection Using Sequences of Systems", Journal of Computer Security 6, dated Aug. 8, 1998, 30 pages.

(Continued)

*Primary Examiner* — Baotran N To
(74) *Attorney, Agent, or Firm* — Hickman Palermo Becker Bingham LLP

(57) ABSTRACT

A code finder system deployed as a software module, a web service or as part of a larger security system, identifies and processes well-formed code sequences. For a data flow that is expected to be free of executable or interpreted code, or free of one or more known styles of executable or interpreted code, the code finder system can protect participants in the communications network. Examples of payload carried by data flows that can be monitored include, but are not limited to, user input data provided as part of interacting with a web application, data files or entities, such as images or videos, and user input data provided as part of interacting with a desktop application.

16 Claims, 6 Drawing Sheets

(51) Int. Cl.
  *G06F 21/00* (2013.01)
  *G06F 21/55* (2013.01)
  *G06F 21/56* (2013.01)
  *H04L 29/08* (2006.01)

(52) U.S. Cl.
  CPC .............. *G06F 21/554* (2013.01); *G06F 21/56* (2013.01); *G06F 21/562* (2013.01); *H04L 63/1425* (2013.01); *H04L 67/02* (2013.01); *H04L 67/42* (2013.01)

(56) References Cited

U.S. PATENT DOCUMENTS

| | | | |
|---|---|---|---|
| 7,434,260 | B2 | 10/2008 | Hong et al. |
| 7,480,385 | B2 | 1/2009 | Weber |
| 7,665,139 | B1 | 2/2010 | Sxor et al. |
| 7,707,223 | B2 | 4/2010 | Zubenko et al. |
| 7,836,425 | B2 | 11/2010 | Rubin et al. |
| 7,895,653 | B2 | 2/2011 | Calo et al. |
| 8,020,193 | B2 | 9/2011 | Bhola et al. |
| 8,091,127 | B2 | 1/2012 | Bradicich et al. |
| 8,170,020 | B2 | 5/2012 | Oliver et al. |
| 8,200,958 | B2 | 6/2012 | Coppola et al. |
| 8,266,202 | B1 | 9/2012 | Colton et al. |
| 8,453,126 | B1 | 5/2013 | Ganelin |
| 8,589,405 | B1 | 11/2013 | Estan |
| 8,677,481 | B1 | 3/2014 | Lee |
| 8,762,962 | B2 | 6/2014 | Ben-Artzi et al. |
| 9,158,893 | B2 * | 10/2015 | Call ................ G06F 21/00 726/22 |
| 2002/0083343 | A1 | 6/2002 | Crosbie et al. |
| 2002/0199116 | A1 | 12/2002 | Hoene et al. |
| 2004/0088651 | A1 | 5/2004 | McKnight et al. |
| 2005/0216770 | A1 | 9/2005 | Rowett et al. |
| 2005/0240999 | A1 | 10/2005 | Rubin et al. |
| 2005/0251536 | A1 | 11/2005 | Harik |
| 2006/0154261 | A1 | 7/2006 | Saxon et al. |
| 2006/0174323 | A1 | 8/2006 | Brown et al. |
| 2006/0288418 | A1 | 12/2006 | Yang et al. |
| 2007/0064617 | A1 | 3/2007 | Reves |
| 2007/0240221 | A1 | 10/2007 | Tuvell et al. |
| 2008/0222736 | A1 | 9/2008 | Bodaei et al. |
| 2009/0070459 | A1 | 3/2009 | Cho et al. |
| 2009/0077383 | A1 | 3/2009 | De Monseignat et al. |
| 2009/0144829 | A1 | 6/2009 | Grigsby et al. |
| 2009/0178059 | A1 | 7/2009 | Lang et al. |
| 2009/0199297 | A1 | 8/2009 | Jarrett et al. |
| 2009/0249310 | A1 | 10/2009 | Meojer et al. |
| 2010/0257354 | A1 | 10/2010 | Johnston et al. |
| 2010/0287132 | A1 | 11/2010 | Hauser |
| 2011/0023118 | A1 | 1/2011 | Wright |
| 2011/0055925 | A1 | 3/2011 | Jakobsson |
| 2011/0154308 | A1 | 6/2011 | Lobo |
| 2011/0255689 | A1 | 10/2011 | Bolotov et al. |
| 2011/0296391 | A1 | 12/2011 | Gass et al. |
| 2011/0314297 | A1 | 12/2011 | Jakobsson |
| 2012/0022942 | A1 | 1/2012 | Holloway et al. |
| 2012/0031969 | A1 | 2/2012 | Hammad |
| 2012/0124372 | A1 | 5/2012 | Dillery et al. |
| 2012/0198528 | A1 | 8/2012 | Baumhof |
| 2013/0198607 | A1 | 8/2013 | Mischook et al. |
| 2013/0219492 | A1 | 8/2013 | Call et al. |
| 2014/0298469 | A1 | 10/2014 | Marion |
| 2015/0058992 | A1 | 2/2015 | El-Moussa |

OTHER PUBLICATIONS

Ye et al., "IMDS: Intelligent Malware Detection System", Industrial Government Track Short Paper, Proc. 13th ACM SIGKDD, dated 2007, pp. 1043-1047.

Szor P., "The Art of Computer Research and Defense", Addision-Wesley (NJ) and Symantec Press, Chapters 10, 11, 13, and 15, dated 2005, 204 pages.

Singh P. K. et al., "Analysis and Detection of Computer Viruses and Worms: An Annotated Bibilography", AMC SIGPLAN Notices, V.37(2) dated 2002, pp. 29-35.

Moser, A. et al., "Limits of Static Analysis for Malware Detection", 23rd Annual Computer Security Applications Conference, dated 2007, pp. 1-10.

Firstbrook, P. et al., "Magic Quadrant for Endpoint Protection Platforms", Gartner RAS Core Research Note G00208912, dated 2010, 21 pages.

"Backus-Naur Form", Wikipedia article, dated 2012, retrieved from http://en.wikipedia.org/windex.php?title+Backus-Naur_Form&oldid=497032078, 6 pages.

U.S. Appl. No. 14/570,632, filed Dec. 15, 2014, Office Action, May 8, 2015.

U.S. Appl. No. 14/055,576, filed Oct. 16, 2013, Office Action, Feb. 26, 2015.

U.S. Appl. No. 13/527,025, filed Jun. 19, 2012, Office Action, Aug. 4, 2014.

U.S. Appl. No. 13/527,025, filed Jun. 19, 2012, Interview Summary, Nov. 17, 2014.

U.S. Appl. No. 13/527,025, filed Jun. 19, 2012, Final Office Action, Feb. 10, 2015.

U.S. Appl. No. 13/527,025, filed Jun. 19, 2012, Notice of Allowance, Apr. 23, 2015.

\* cited by examiner

SYSTEM FOR FINDING CODE IN A DATA FLOW

CROSS-REFERENCE TO RELATED APPLICATIONS; BENEFIT CLAIM

This application is a continuation of application Ser. No. 13/527,025, filed Jun. 19, 2012, which issued on Oct. 17, 2015, as U.S. Pat. No. 9,158,893, and which claims the benefit U.S. Provisional Application No. 61/600,145, filed Feb. 17, 2012, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

BACKGROUND

1. Filed of the Invention

The present invention relates to systems for detection of undesired computer programs in network communications and other sources of input data.

2. Description of Related Art

Systems are vulnerable to malicious computer programs in a variety of settings. In theory, these vulnerabilities should be eliminated through disciplined coding practices, including routines for strong validation of system input. In practice, vulnerability-free software has been difficult to achieve.

In order for a vulnerability to be successfully exploited, code from the unwanted program must be present in system input. This code is sometimes referred to as shell code. Shell code consists of either directly executable instructions, such as would run on a microprocessor, or higher level programming language instructions suitable for interpretation.

Many attempts have been made to reliably identify attacks by unwanted programs. Methods include, but are not limited to, processes that rely on signatures for known attacks, on heuristics to recognize patterns similar to known attacks, on regular expressions that attempt to identify problematic code, on statistical analysis of system input to identify code, and on controlled execution of systems using unknown input to monitor application behavior in an instrumented environment. None of these strategies represents a completely reliable mechanism of identifying problematic input.

It is desirable therefore to provide technology to improve the security of data flows between data processing systems, without imposing undue burdens, such as delays, costs or increases in latency, on the users of the communication channels.

SUMMARY

A code finder technology is provided for monitoring a data flow providing input data to a destination processing system, to detect well-formed code in the data flow. The payload of the data flow can be modified to disable or remove any detected well-formed code before it is passed out of the communication channel into a destination processing system. Alternatively, or in combination, the destination can be warned before the well-formed code is delivered to the destination processing system.

The term "payload" in this context refers to all or part of the data carried by the data flow, and can exclude for example overhead of a transport protocol that is run to manage the data flow. Examples of payload carried by data flows that can be monitored include, but are not limited to, user input data provided as part of interacting with a web application, data files or entities, such as images or videos, and user input data provided as part of interacting with a desktop application.

The data flow can be scanned to detect tokens that represent candidate code elements, where a token can consist of a character or a character sequence used to define executable lines of code. The detected token can be parsed to identify sequences of candidate code elements which could constitute well-formed code.

A data flow between network destinations can be executed according to a transport protocol which is configured to deliver data entities, values for parameters, user input and other forms of payload data from one platform to another. A data flow that comprises user input supplied at a data processing system, can include contents of a portable storage medium, a data flow provided using a keyboard or a touch screen, and other forms of user input.

Well-formed code can be specified by syntax graphs, and sequences of tokens can be classified as a fragment of well-formed code by satisfying one of the syntax graphs. The syntax graphs can be configured as searchable data structures, using for example a node-link structure. The system can monitor payloads for code expressed in any one of a plurality of computer programming languages, using for example multiple syntax graphs, each of which can encode a syntax for well-formed code according to a particular computer programming language. Data structures other than syntax graphs can be used in some embodiments, such as pushdown machines.

Computer programming languages which can be monitored as described herein include low level programming languages, such as languages known as binary executable code or machine executable code, and higher level programming languages, including languages which can be compiled or otherwise processed for translation to lower level programming languages.

Other aspects and advantages of the present technology can be seen on review of the drawings, the detailed description and the claims, which follow.

DETAILED DESCRIPTION

A detailed description of embodiments of the present invention is provided with reference to the FIGS. 1-6.

Figure 1:
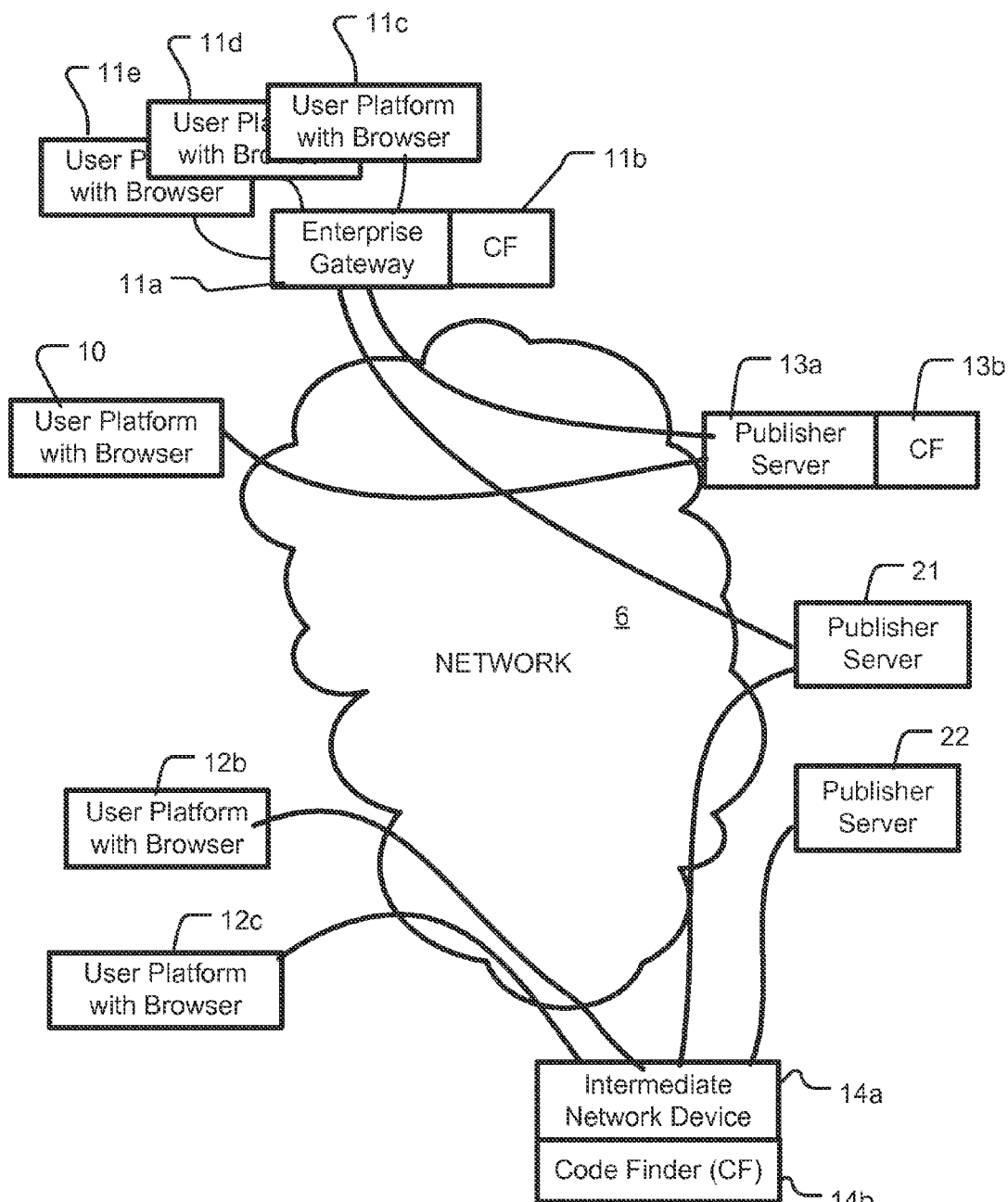
FIG. 1 is a diagram representing a communication network including code finder systems.

FIG. 1 is a contextual diagram illustrating a network environment 6 employing code finder technology which, for example, is implemented by executing processes in an intermediate network device, a network destination device, a security appliance, enterprise gateway device or other network elements having data processing resources positioned in a manner that allows monitoring of a data flow on a communication channel before delivery of the data flow to the destination vulnerable to undesired code in the payload. The network environment 6 can comprise the Internet, other wide area network configurations, local area network configurations and so on. The network configuration 6 can include for example a broadband backbone bringing together a wide variety of network physical layer protocols and higher layer protocols. One or more layers of transfer protocols are used for transferring payloads across communication channels between devices. Such protocols can be HTTP, HTTPS, SPDY, TCP/IP, FTP and the like. The technology described herein can be deployed in network configurations other than the Internet 6 as well. A payload in a transfer protocol can include entities being shared, such as text files, digital sample streams, image files, video files, webpages, and the like, as well as other user input, like parameters for identifying dynamic webpages, and parameters for search queries.

FIG. 1 shows some alternative configurations in which the code finder technology described herein can be deployed. In one configuration, user platform 10 is connected via a communication channel, such as an HTTP session linking via a TCP/IP socket, to a publisher server 13a executing on a data processing system. The server 13a can host a website for example which exchanges data with the user platform 10, which can comprise a data processing device with a browser and supporting network protocol stack programs, or other programs that enable it to establish a communication channel on the network. The publisher server 13a includes a module 13b, which can comprise a loadable web server extension for example, which executes the code finder processes on payload incoming from user platform 10. The code finder in module 13b can be configured to monitor data flows at the server 13a provided via channels other than the network, such as keyboards, touch screens, portable storage media, etc.

In another configuration, an enterprise gateway 11a, configured for example as a security appliance, is connected via a communication channel to the publisher server 13a, as well as other publisher servers (e.g. 21) in the network environment 6. The enterprise gateway 11a acts as a network intermediate device between user platforms 11c, 11d, 11e and the broader network. In this example, the enterprise gateway 11a includes a module 11b which executes the code finder processes on payload traversing the gateway 11a.

In yet another configuration, an intermediate network device 14a, configured for example as a proxy server, includes a module 14b that executes the code finder processes on payloads which traverse via communication channels between user platforms 12b, 12c and publisher servers 21, 22 in the network.

In yet other configurations, a code finder module (not shown) can be configured to monitor data flows at a portable computing device, personal computer or workstation for example, that are provided via channels other than the network, such as keyboards, touch screens, portable storage media, audio channels, etc. One such data flow can comprise input data provided by a user for a desktop application, for example.

Operation of the code finder can be understood with respect to the following example, based on the REQUEST message type of the HTTP protocol. In this example, the data flow can include a GET request received at a code finder module, as follows:

```
GET/form.php?param1=%E2%80%98%20AND%20%E2%80%981%E2
%80%99%20NOT%20NULL%0Aotherdata¶m2=okdata HTTP 1.1
HOST example.com
User-Agent: Agent String
```

This request seeks processing of a php form using first and second parameters, param1 and param2, from a destination "example.com." The request also includes the user agent string associated with the session.

The payload in this example includes the data values for param1 and param2, and potentially the host URL and the agent string from the user. A portion of the payload is "escape" encoded, and must be decoded by applying an "unescape" process, prior to scanning for well-formed code. After the decoding, the GET request includes the following:

```
GET /form.php?param1 =' AND '1' NOT
   NULLotherdata¶m2=okdata HTTP 1.1
HOST example.com
User-Agent: Agent String
```

The code finder can identify a well-formed code sequence, which consists in this example of the fragment: 'AND '1' NOT NULL. The code finder can then modify the data flow by removing the identified well-formed code fragment, resulting in the following:

```
GET /form.php?param1 =otherdata¶m2=okdata HTTP 1.1
HOST example.com
User-Agent: Agent String
```

This is the HTTP Request case, originating from a user platform. As 15 mentioned above, it is also possible in some cases to apply the same process to content returned by a webserver which acts as a publisher of a website or other content, protecting the user platforms which utilize the content. For example, the enterprise gateway 11a can be configured to protect the user platforms 11c, 11d, 11e from publishers and other sources of payload in the broader network environment. Also, the 20 transfer protocol level at which the monitoring is executed can be lower or higher in the protocol stack, as suits a particular implementation.

Figure 2:
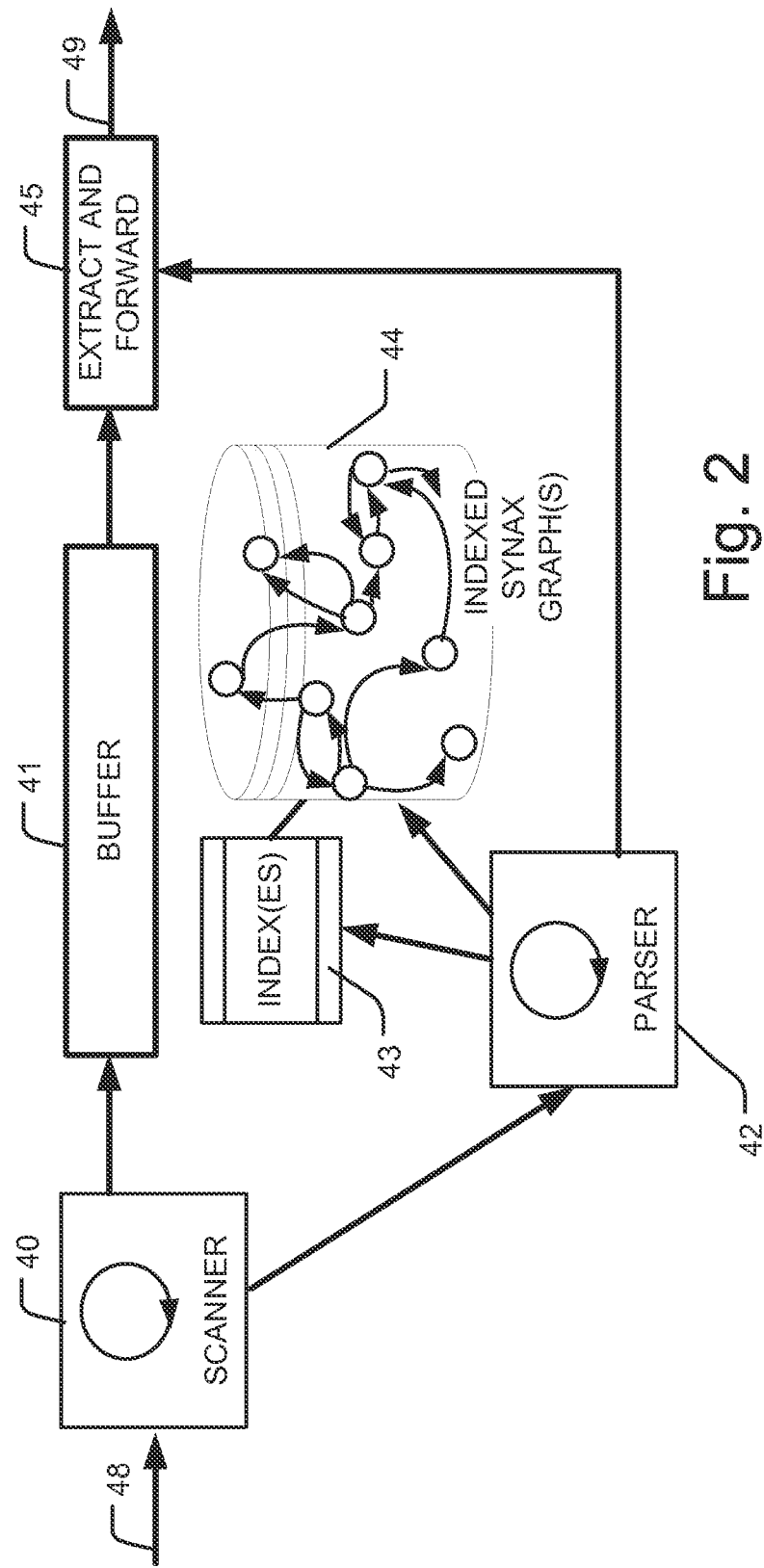
FIG. 2 is a block diagram of a code finder system.

FIG. 2 illustrates components of an implementation of code finder technology. A data flow is received via a communication channe148. The data flow is applied to a scanner 40 and to a buffer 41. The scanner 40 and buffer 41 are shown in series only for the purposes of the diagram. Other configurations could be used, such as for example, arranging the scanner 40 and buffer 41 in parallel, and arranging the buffer 41 in advance of the scanner 40. The scanner 40 scans the payload for tokens that can represent candidate code elements. In some embodiments, the scanner 40 can include logic to translate data in the data flow into characters according to known character sets, such as ASCII character sets, that can be used to express a computer programming language. The candidate code elements are delivered to a parser 42, which is coupled to syntax mapping logic, such as an indexed syntax graph store 44. The store 44 includes indexed syntax graphs for at least one, and preferably a plurality of, computer programming languages. Indexes 43 are included with the store 44, which map hard tokens into their corresponding syntax graphs. The syntax graphs in the store are configured to recognize sequences that include fragments of code that can present a threat to a receiving platform. Such fragments are defined according to the needs of a particular implementation. In one example, a sequence can be classified as a well-formed fragment to be processed if it meets any one of a number of preset rules. For example, a set of preset rules can include whether the sequence is a valid expression or statement in the subject programming language, whether the sequence includes a threshold number of tokens, and whether the sequence satisfies empirical guidelines.

In alternative configurations, the syntax mapping logic could be implemented using other data structures, such as a parse tree, with a lookup table for hard tokens. Also, the syntax mapping logic could be implemented using pushdown machines, which comprise finite state machines that accept input tokens and apply them to pending stacks of tokens according to the syntax rules. A system utilizing pushdown machines for syntax mapping could maintain instances of the pushdown machines for each language. An index in such systems could be employed to assign new hard tokens to the instances of pushdown machines in condition to accept a hard token, including pushdown machines having empty stacks, associated with the programming languages being monitored.

Upon identifying a well-formed code sequence that can be classified as a fragment, the parser notifies logic 45 which processes the identified sequence by, for example, extracting the identified sequence from the payload in the buffer 41, and forwarding the modified payload on communication channel 49 toward its destination. The scanner 40 and parser 42 can operate on system input at runtime.

In an alternative, the logic 45 can return information about the identified sequences to the destination, in advance of or with the payload, so that the problematic input may be appropriately handled at the destination system. Also, in some embodiments, the identified sequences can be processed in other ways, including logging the identified sequences for later analysis, flagging identified sequences in network configuration control messages, identifying the sources of the identified sequences, and so on.

In one example configuration, the scanner 40 reads a stream of input payload, and converts it into tokens. Two types of tokens are identified. One type is hard tokens. Hard tokens are keywords or punctuation found in a set of programming languages to be recognized by the code finder. A list of known hard tokens is created during creation of the syntax graph for each programming language. Thus, a hard token is a token that appears in the index for one or more programming languages being monitored. Soft tokens are collections of characters that are not hard tokens. Tokens in a payload being scanned can be individually identified for example by identifying boundaries such as whitespace or other non-punctuation characters. In some examples, the parser 42 can accumulate a threshold number of sequential soft tokens before walking the syntax graph or graphs for matches.

Examples of hard tokens and soft tokens can be understood from the following example of a payload in the form of a simple Structured Query Language (SQL) query:

SELECT *FROM auth user WHERE username = 'admin' AND password = sha1( 'passwd')

In this example SQL query, a hard token index for SQL could identify 14 hard tokens, including the following:

SELECT
*
FROM
WHERE
=
'
'
AND
(
'
'
)
;

There are six soft tokens in this example SQL query, including the following:

auth user
username
admin
password
sha1
passwd

In one example implementation of the parser 42, the parser 42 consults an indexed syntax graph in the store 44. The indexed syntax graph store includes graphs, that can be configured as hierarchical node-link structures for example, which characterize well-formed code sequences encoded by a set of specified recognizable programming languages. To facilitate recognition of partial statements or expressions, and to allow for flexibility of the beginning of sequences, hard tokens are preferably indexed to allow immediate lookup.

Using additional input from the payload, the parser finds the longest possible path through the graph that matches the input for each programming language being monitored. If no path can be found, the parser continues the process using the next hard token. The parser need not attempt to differentiate between 'good' and 'bad' code, but rather can attempt to identify sequences of tokens that satisfy the syntax graph set up as described above. Beginning with the first non-matching token, information about the result can be returned.

A code finder system need not attempt to recognize input as well-formed statements or expressions. A code finder system can merely identify sequences that meet the parameters of the syntax graphs. This is advantageous because shell code, or other unwanted code in a payload, may be incomplete and rely on the existence of prior instructions or other state present in the targeted system. For example, injection attacks against web applications commonly consist of SQL instructions that unexpectedly terminate an application's original SQL statement and add additional commands.

Figure 3:
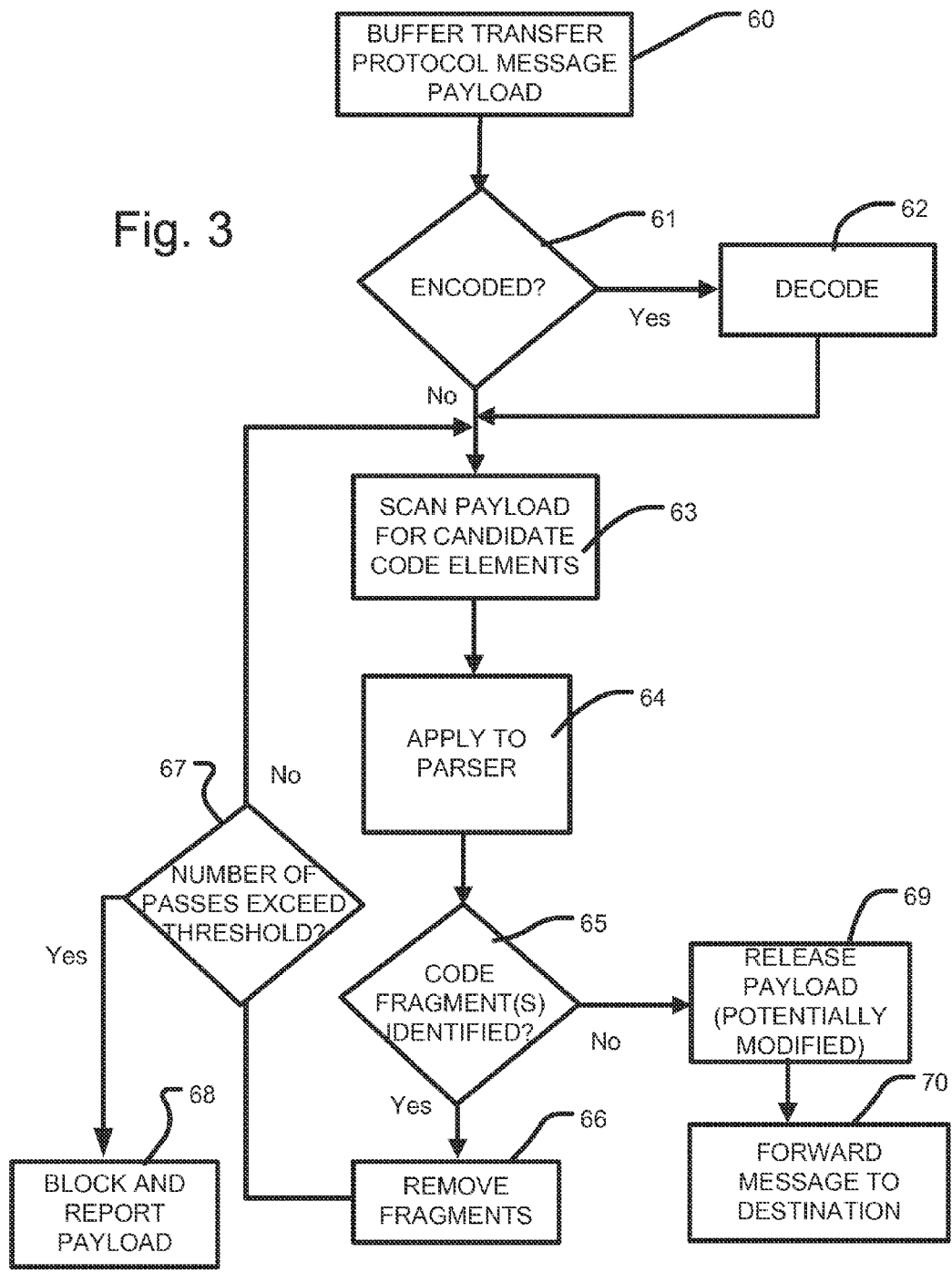
FIG. 3 is a flow chart illustrating logic processes executed by an embodiment of a code finder system.

FIG. 3 is a flowchart of an example of basic logic which can be executed by a system configured as illustrated in FIG. 2. In a first step, the data flow, including a payload, from a transfer protocol message is buffered (60). The logic, preferably identifies the payload in the data flow, and determines whether the payload is encoded, such as by "escape" encoding (61). If it is encoded, then the logic applies the decode function (62). If the payload is not encoded, or after decoding, the logic scans the payload to select candidate code elements, and potentially classifies the candidate code elements as hard tokens (i.e., tokens listed in the indexes for the set of monitored programming languages) and soft tokens (63). The tokens are applied to the parser (64), which attempts to identify well-formed code fragments. The logic determines whether any well-formed code fragments have been identified (65). If at step 65, a well-formed code fragment is identified, then the logic removes the identified fragment (66), and performs another pass through the payload by looping to step 63, with the modified payload, provided that a threshold number of passes has not already been executed (67). In preferred systems, at least two passes are executed (the threshold of block 67 is at least two) to detect nested code fragments, or other arrangements of code fragments that could be implemented to avoid detection in a single pass, or a small number of passes. If the number of passes exceeds the threshold, then the payload can be blocked and reported (68), or processed in other ways.

If at step 65, no well-formed code fragments are identified, then the payload (potentially modified) can be released (69) and forwarded to processing resources at its destination (70).

The processing of the fragments can include removing them from the payload as mentioned above. In other embodiments, the fragments can be altered or modified in some manner to disable them while preserving the byte counts and the like needed by the transport protocol. Alternatively, the processing of the sequences can comprise composing warning flags or messages to be associated with a payload and forwarded to the destination or a network management system, in a manner that results in a warning to the destination before the payload is delivered to vulnerable processing resources at the destination where the code sequence can be executed. For example, a warning can be intercepted in the communication stack of a system hosting a destination process before delivery of the payload to locations in the data processing system hosting the destination process, at which the code sequence can be executed or combined with executable code, and thereby do harm to processes, including the destination process, executing in the system.

The order of the steps shown in FIG. 3 can be modified, and some steps can be executed in parallel, as suits a particular implementation.

Figure 4:
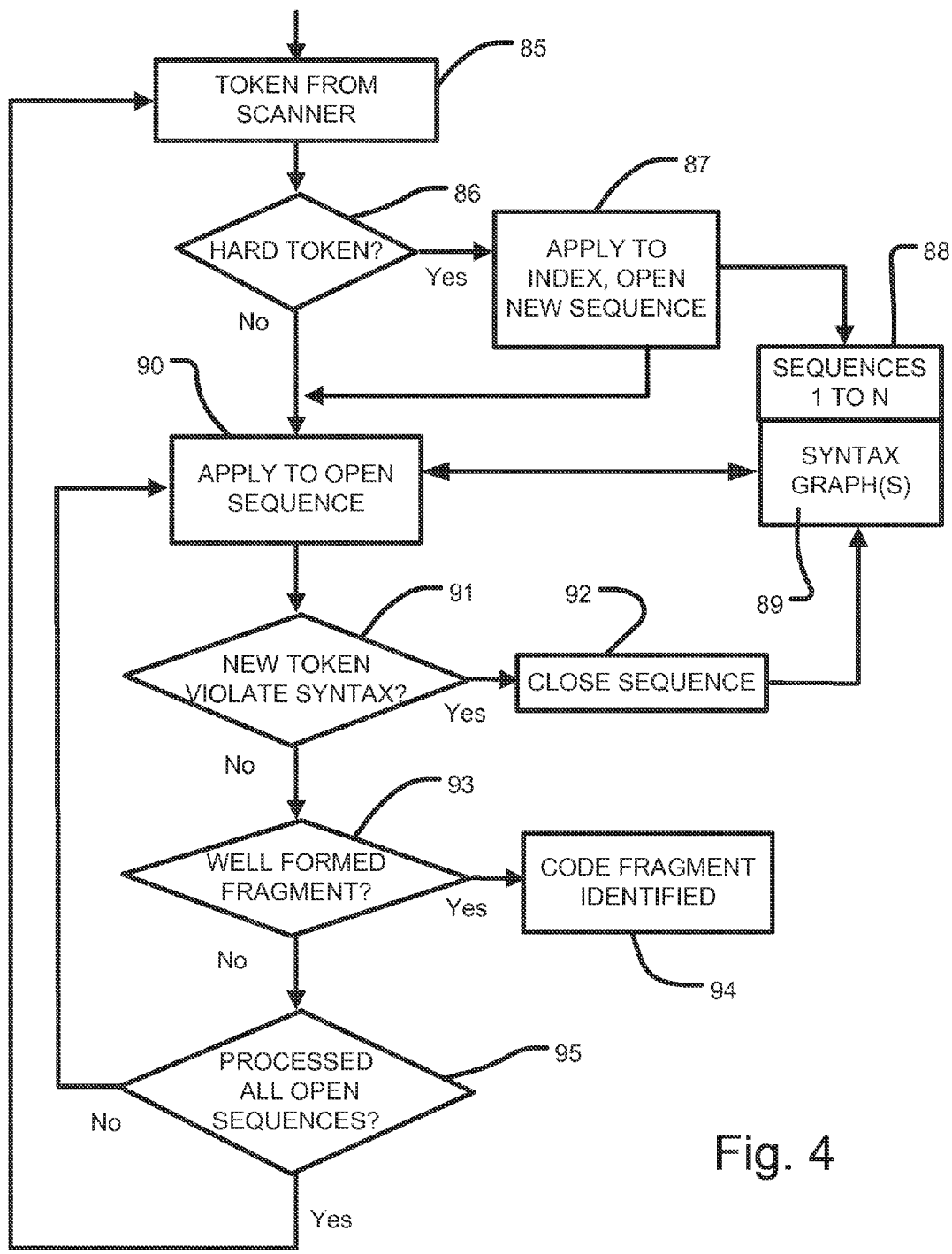
FIG. 4 is a flow chart illustrating logic processes executed by a system scanning a data flow to detect code sequences that satisfy a syntax graph for a computer programming language.

FIG. 4 illustrates one process for walking an indexed syntax graph, which can be executed by the parser. Beginning, for example, at step 64 in FIG. 3, the parser can receive a token from the scanner (65). The process determines whether the received token is a hard token (86). If it is a hard token, then it is applied to the index or indices available to the parser, and a new sequence is opened for each syntax graph in which there is a match on the index (87). The logic stores a set of sequences in a data structure (88), the data structure holding sequences in process for identification of well-formed code fragments, including any new sequences opened in step 87. After processing hard tokens in step 87, or if the token was not a hard token at step 86, then the logic applies the token to open sequences stored in the data structure 88 associated with the syntax graphs (89). The logic can determine for each open sequence whether the new token violates the syntax (91). If it does violate the syntax without having resulted in identification of a well-formed code fragment, then the sequence can be closed (92). If the new token does not violate the syntax for the open sequence, then the logic determines whether the open sequence with the new token qualifies as a well-formed fragment (93). If a well-formed fragment is identified, then the well-formed fragments can be reported to logic for processing the payload as mentioned above (94). If a well-formed fragment has not been identified at step 93, then the logic determines whether all of the open sequences have been processed with the new token (95). If there are additional open sequences in the data structure 88, then the process applies the token to the next open sequence at block 90. If all the open sequences have been processed, then the logic processes a next token at block 85.

The order of the steps shown in FIG. 4 can be modified, and some steps can be executed in parallel, as suits a particular implementation.

Figure 5:
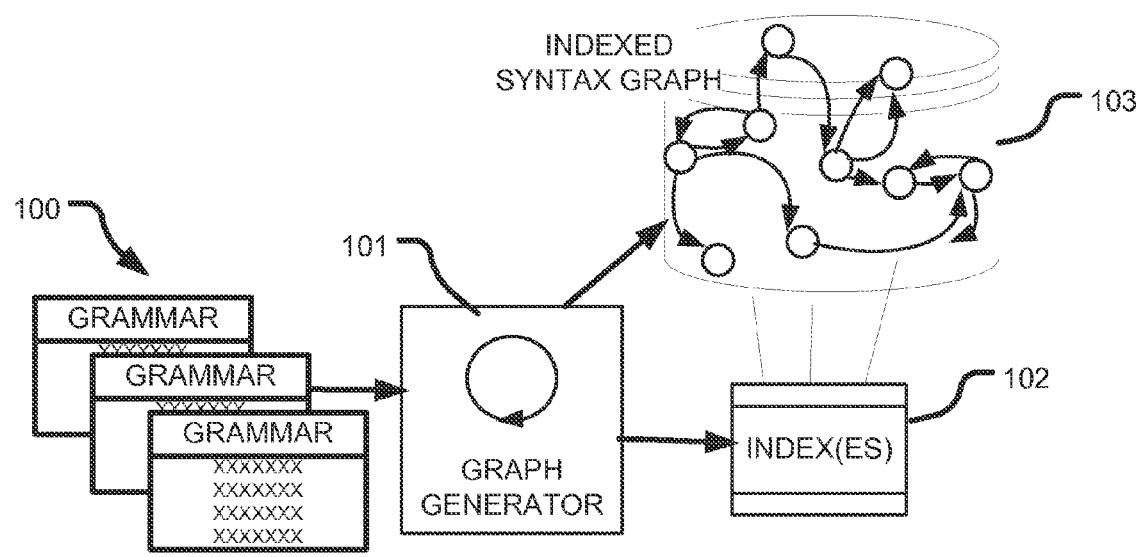
FIG. 5 is a block diagram of a system for creating syntax graphs for computer programming languages.

FIG. 5 is a simplified diagram of a graph generator system for generating indexed syntax graphs for programming languages, which can be used in a code finder system. In this example, each input programming language is specified by a grammar 100 such as a Backus-Naur Form BNF or Extended Backus-Naur Form EBNF syntax specification, or any other suitable language capable of defining a grammar. Using the input grammars, the graph generator produces a series of unique nodes representing the tokens that are used to form programming language statements and expressions. Paths between nodes that sequence the tokens into statements and expressions are similarly created. Indexes into the resulting data structure that reference hard tokens are retained for later use. Thus, the graph generator logic 101 can traverse a grammar, identifying and creating a list of hard tokens for the programming language. Also, the graph generator logic 101 produces a data structure, such as a node-link data structure arranged as a directed graph which can be walked by a parser, and stores the data structure in the indexed syntax graph store 103. Then, the list of hard tokens is mapped to corresponding nodes in the graph, forming the index 102. Nodes in the directed graph represent one or more tokens of the subject programming language, which are compliant with the specified grammar. A transition from one node to the next can be taken upon receipt of a next token, provided that there is a valid transition from the current node based on that next token. The nodes in the directed graph can be labeled as corresponding to well-formed code fragments. Also, nodes at the leaves in the directed graph for which there is no valid transition based on a next token can necessarily correspond to well-formed code fragments.

A sequence of tokens in a data flow can include a well-formed fragment beginning at any node in the graph. A node representing any sequence including more than two transitions, for example, can be identified as an open sequence, when selected using a hard token.

The grammar for a language defines the rules by which well formed fragments and valid sentences (sequences of tokens) are formed. Given a specific token, identifying the tokens that can legally follow it is usually dependent the sequences of tokens that preceded it. In the case of code fragment detection, these preceding tokens are not known. Thus to detect well formed code fragments, the code detector parser determines, according to the rules for a given grammar, the viable prefixes for any stream of tokens found in the input starting with a hard token. That is, what sequences of tokens, if they immediately preceded the token stream starting with the hard token, would result in a valid parse of sufficient length to meet the detection rules. The indexed syntax graph encapsulates the knowledge required for the parser to calculate those prefixes given a hard token.

Algorithms for generating parsers can be used in the generation of indexed syntax graphs. For example, algorithms in the LR family of parsers (e.g. SLR, LALR, LR) define two tables, called the action and goto tables. These tables in combination contain information necessary to determine viable prefixes for a given token and are indexed by token. A code fragment detection parser can be built using the LR tables for a given grammar, as the indexed syntax graph. Also, algorithms for constructing GLR parsers also generates data structures that are sufficient for use as the indexed syntax graph.

Another common type of parser used for computer languages are LL parsers. LL parsers are simpler to implement but can only be used for a subset of the languages that LR parsers can handle (e.g. LL can not be used for C++). With LL parsers, part of the knowledge required to determine viable prefixes is encoded directly as executable code in the parser rather than a traversable data structure. A modified LL parser generator algorithm can be used to generate an indexed syntax graph. Indeed, a variety of parsing algorithms can be used to produce a suitable indexed syntax graph, or can be modified to do so.

Graph generation can be performed offline. The graph generator makes use of structured grammars for the desired recognizable programming languages. Given the specialized nature of this parsing application, ambiguity in the grammar can be tolerated. This makes it possible to represent programming languages which may otherwise be impossible to parse.

Figure 6:
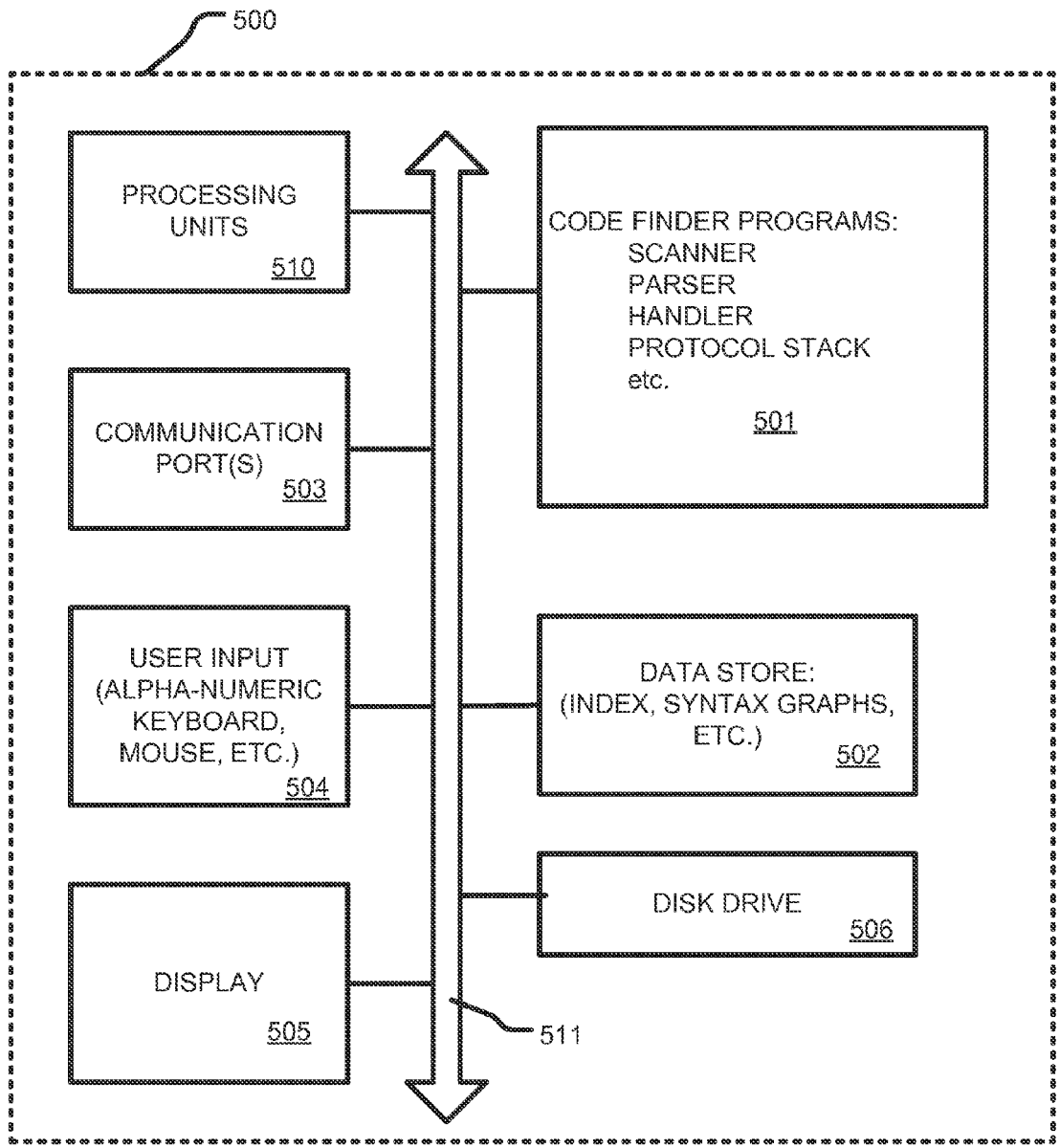
FIG. 6 is a block diagram representing a network device including code finder resources.

FIG. 6 is a simplified block diagram of a data processing system 500 including a code finder system, like device 14a with module 14b in FIG. 1. The system 500 includes one or more processing units 510 coupled to a bus or bus system 511. The processing units 510 are arranged to execute computer programs stored in program memory 501, access a data store 502, access large-scale memory such as a disk drive 506, to control interfaces including communication ports 503, user input devices 504, audio channels (not shown), etc. and to control a display 505. The data store 502 includes indices, syntax graphs, buffers and so on. The device as represented by FIG. 6 can include for examples, a network appliance, a computer workstation, a mobile computing device, and networks of computers utilized for Internet servers, proxy servers, network intermediate devices and gateways.

The data processing resources include logic implemented as computer programs stored in memory 501 for an exemplary system, including a scanner, a parser and a communications handler. In alternatives, the logic can be implemented using computer programs in local or distributed machines, and can be implemented in part using dedicated hardware or other data processing resources.

An article of manufacture comprising a non-transitory machine readable data storage medium, such as an integrated circuit memory or a magnetic memory, can include executable instructions for a computer program stored thereon, the executable instructions comprising:
logic to buffer a data flow received at an interface;
logic to scan the data flow to detect well-formed code sequences expressed in at least one computer readable programming language;
logic to process the detected sequences; and
logic to forward the data flow from the buffer to a destination.

The logic to scan the data flow implemented by executable instructions in the article of manufacture, detects tokens that represent candidate code elements, and including logic to parse the tokens in the data flow according to a syntax graph stored in a data structure, the syntax graph encoding a syntax for a computer programming language, to identify sequences of candidate code elements which satisfy the syntax graph. The syntax graph data structure encodes syntaxes for a plurality of programming languages. Also, in the article of manufacture, the memory can store the indexed syntax graph.

Rather than attempt to approximate an answer to the question of whether some given input contains shell code, a code finder system as described herein can take advantage of the fact that both executable and interpreted code are designed to be machine readable. Similarly, a code finder system as described herein takes advantage of the fact that well-formed code is difficult to construct. When compared to unstructured user input or most data formats, the likelihood of the accidental presence of well-formed code is infinitesimal. In short, a code finder system as described herein can be configured to deterministically and definitively recognize the presence of shell code within a data flow used to provide system input with minimal risk of misidentification.

Also, a code finder system need not be concerned with unambiguously differentiating a particular statement from another statement. Since statements are not translated and executed by the code finder system, intra- or inter-language ambiguity is not a factor in some embodiments. In these embodiments recognition logic can be simplified, as any match is sufficient to invoke processing of a suspected code fragment.

A code finder system is described that can recognize multiple programming languages simultaneously. This, when combined with the inherent structured nature of machine readable programming languages, enables recognition to occur quickly enough to be useful for monitoring data flows in a communications channel.

A code finder system may be deployed as a software module, a web service or as part of a larger security system. For a data flow that is expected to be free of executable or interpreted code, or free of one or more known styles of executable or interpreted code, the code finder system can be deployed to protect participants in the communications network from undesired code. Examples of payload carried by data flows that can be monitored include, but are not limited to, user input data provided as part of interacting with a web application, data files or entities, such as images or videos, and user input data provided as part of interacting with a desktop application.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An intermediary computer system coupled to a client computer and a web server computer, comprising:
a memory;
one or more processors coupled to the memory, and configured to:
receive, at an intermediary computer from a client computer, a first data flow that includes one or more first programming instructions, which are nested in one or more second programming instructions, from a computer readable programming language;
determine the first data flow includes the one or more first programming instructions;
remove the one or more first programming instructions nested in the one or more second programming instructions from the first data flow to produce a second data flow, which includes the one or more second programming instructions, but does not include the one or more first programming instructions;
determine whether the second data flow includes the one or more second programming instructions;
in response to determining the second data flow includes the one or more second programming instructions, remove the one or more second programming instructions from the second data flow to produce a third data flow that does not include any programming instructions;

in response to determine the third data flow does not include any programming instructions, send a second request with the third data flow to a destination process executing on the web server computer to be processed.

2. The intermediary computer system of claim 1, wherein the first data flow is escaped encoded, and the one or more processors are configured to unescape the first data flow before detecting the first data flow includes the one or more first programming instructions.

3. The intermediary computer system of claim 1, wherein the one or more processors are configured to perform at least two steps in parallel.

4. The intermediary computer system of claim 1, wherein the one or more processors are configured to log the one or more first programming instructions and the one or more second programming instructions.

5. The intermediary computer system of claim 1, wherein the one or more first programming instructions are in a first programming language of a plurality of computer readable programming languages, and the one or more second programming instructions are in a second programming language of the plurality of computer readable programming languages.

6. The intermediary computer system of claim 5, wherein the one or more processors are configured to:
generate a first syntax graph associated with a first programming language, wherein determining whether the first data flow includes the one or more first programming instructions is based on the first syntax graph after the first syntax graph is generated;
generate a second syntax graph associated with a second programming language, wherein determining whether the second data flow includes the one or more second programming instructions is based on the second syntax graph after the second syntax graph is generated.

7. The intermediary computer system of claim 1, wherein the one or more processors are configured to generate a syntax graph comprising a data structure for finding code elements included in data received from a client computer, wherein:
the syntax graph encodes syntaxes for a first computer-readable programming language and a second computer-readable programming language;
the first computer-readable programming language is different than the second computer-readable programming language;
the one or more first programming instructions are one or more first valid expressions in the first computer-readable programming language;
the one or more second programming instructions are one or more second valid expressions in the second computer-readable programming language;
determining whether the first data flow includes the one or more first programming instructions is based on the syntax graph after the syntax graph is generated;
determining whether the second data flow includes the one or more second programming instructions is based on the syntax graph after the syntax graph is generated.

8. The intermediary computer system of claim 1, wherein the first data flow comprises a message compliant with a network transport protocol carrying a payload, wherein determining the first data flow includes the one or more first programming instructions comprises parsing the payload.

9. A method to remove computer readable instructions from a data flow before the data flow is received by a web server computer comprising:
receiving, at an intermediary computer from a client computer, a first data flow that includes one or more first programming instructions, which are nested in one or more second programming instructions, from a computer readable programming language;
determining the first data flow includes the one or more first programming instructions;
removing the one or more first programming instructions nested in the one or more second programming instructions from the first data flow to produce a second data flow, which includes the one or more second programming instructions, but does not include the one or more first programming instructions;
determining whether the second data flow includes the one or more second programming instructions;
in response to determining the second data flow includes the one or more second programming instructions, removing the one or more second programming instructions from the second data flow to produce a third data flow that does not include any programming instructions;
in response to determining the third data flow does not include any programming instructions, sending a second request with the third data flow to a destination process executing on the web server computer to be processed.

10. The method of claim 9, wherein the data flow is escaped encoded and the method comprises unescaping the data flow before detecting the first data flow includes the one or more first programming instructions.

11. The method of claim 9, wherein at least two steps are performed in parallel.

12. The method of claim 9 comprising logging the one or more first programming instructions and the one or more second programming instructions.

13. The method of claim 9, wherein the one or more first programming instructions are in a first programming language of a plurality of computer readable programming languages, and the one or more second programming instructions are in a second programming language of the plurality of computer readable programming languages.

14. The method of claim 13 comprising:
generating a first syntax graph associated with a first programming language, wherein determining whether the first data flow includes the one or more first programming instructions is based on the first syntax graph after the first syntax graph is generated;
generating a second syntax graph associated with a second programming language, wherein determining whether the second data flow includes the one or more second programming instructions is based on the second syntax graph after the second syntax graph is generated.

15. The method of claim 9 comprising generating a syntax graph comprising a data structure for finding code elements included in data received from a client computer, wherein:
the syntax graph encodes syntaxes for a first computer-readable programming language and a second computer-readable programming language;
the first computer-readable programming language is different than the second computer-readable programming language;
the one or more first programming instructions are one or more first valid expressions in the first computer-readable programming language;

the one or more second programming instructions are one or more second valid expressions in the second computer-readable programming language;

determining whether the first data flow includes the one or more first programming instructions is based on the syntax graph after the syntax graph is generated;

determining whether the second data flow includes the one or more second programming instructions is based on the syntax graph after the syntax graph is generated.

16. The method of claim 9, wherein the data flow comprises a message compliant with a network transport protocol carrying a payload, wherein determining the first data flow includes the one or more first programming instructions comprises parsing the payload.

\* \* \* \* \*